Jan. 13, 1970  C. O. BREITSPRECHER ET AL  3,489,163
PRESSURE REDUCING VALVE
Filed July 24, 1967  2 Sheets-Sheet 1
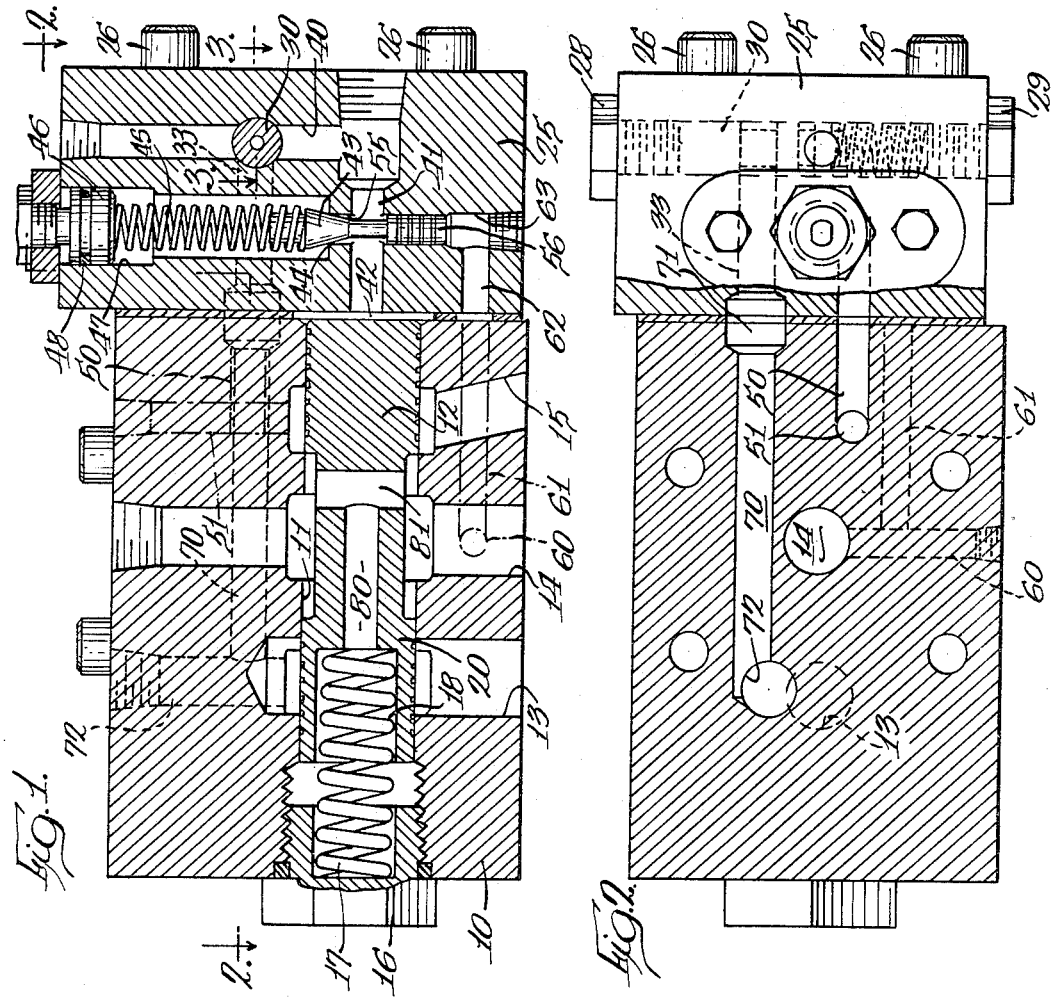
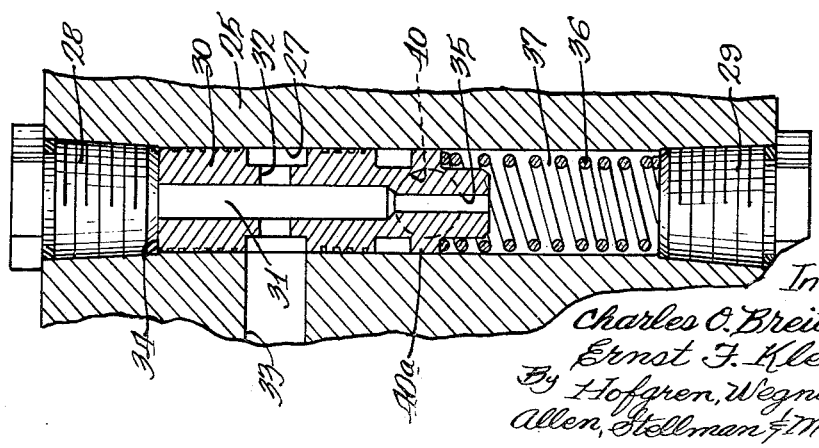
Inventors:
Charles O. Breitsprecher
Ernst F. Klessig
By Hofgren, Wegner,
Allen, Stellman & McCord
Attys

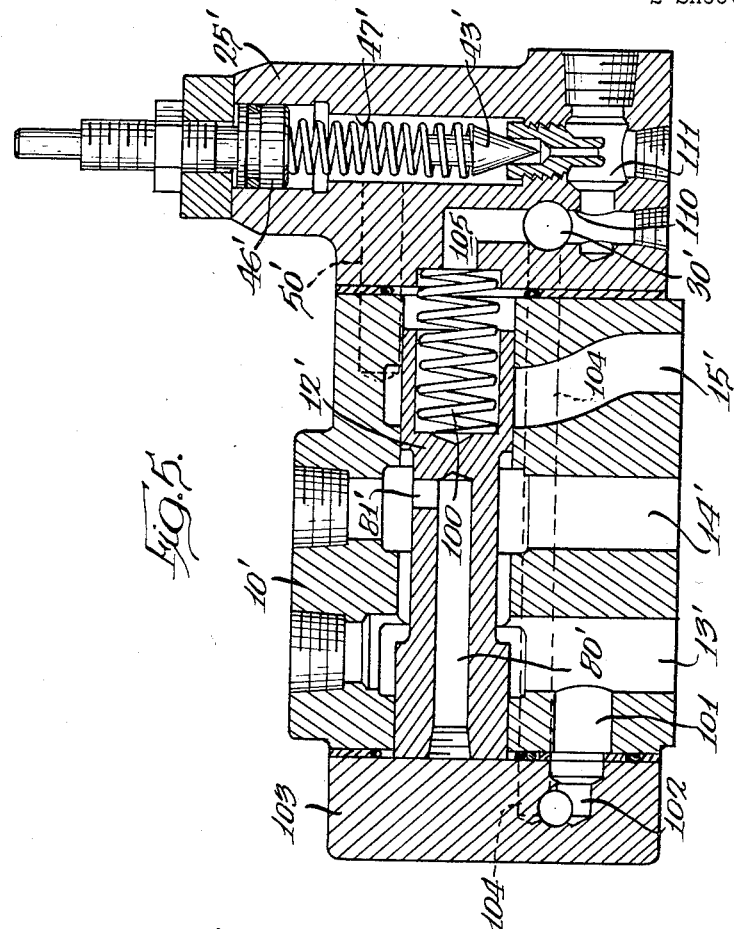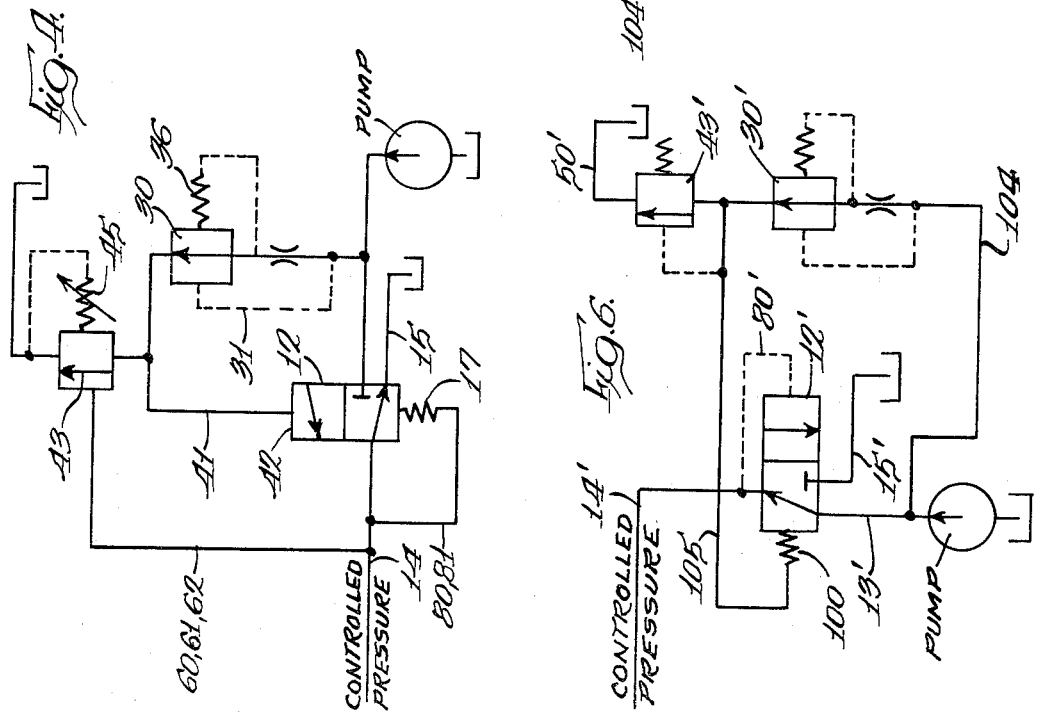

United States Patent Office 3,489,163
Patented Jan. 13, 1970

3,489,163
PRESSURE REDUCING VALVE
Charles O. Breitsprecher and Ernst F. Klessig, Racine, Wis., assignors to Racine Hydraulics, Inc., a corporation of Wisconsin
Filed July 24, 1967, Ser. No. 655,609
Int. Cl. G05d 7/01, 16/10
U.S. Cl. 137—116.3                                 5 Claims

ABSTRACT OF THE DISCLOSURE

A pressure reducing valve having a valve member acted upon oppositely by inlet pressure and a controlled reduced pressure, with the inlet pressure acting on the valve member in a direction to open the reducing valve to insure opening of the valve and with or without the use of a bias spring.

BACKGROUND OF THE INVENTION

This invention relates to pressure reducing valves. Now existing pressure reducing valves have a valve member biased in opening direction by a bias spring and urged in the opposite direction by a controlled reduced outlet pressure. Such valves are slow in adjusting movement because the entire movement of the valve member in opening the valve is caused only by force of the biasing spring. This spring must be fairly strong, with the result that there is a substantial pressure drop through the valve. Additionally, relying on a bias spring to open the valve is less than satisfactory when the valve member may stick because of dirt in the valve, since the outlet pressure must drop to zero before the bias spring can become fully effective in shifting the valve member toward open position.

SUMMARY

An object of this invention is to provide a new and improved pressure reducing valve.

Another object of the invention is to provide a pressure reducing valve wherein the valve member can omit the normal bias spring, with the fluid at inlet pressure operating on the valve member to urge the valve member in a valve opening direction.

Still another object of the invention is to provide a pressure reducing valve in which control means is provided to limit the flow of inlet pressure fluid acting in control of the valve member and a pressure relief valve for setting the maximum pressure operative on the valve member and being positioned downstream from the flow control means.

A further object of the invention is to provide a pressure reducing valve in which yieldable means urge the valve member to a closed position and inlet pressure is applied to the valve member in a direction to open the valve member whereby a high pressure surge in the inlet before the valve opens cannot get to the outlet of the valve and wherein a relief valve is subject only to controlled outlet pressure from the reducing valve whereby full system pressure can be applied against the valve member to urge the valve member in a direction to open the pressure reducing valve.

BRIEF DESCRIPTION OF THE DRAWINGS

Further objects and advantages will become apparent from the following detailed description taken in connection with the accompanying drawings in which:

FIG. 1 is a central vertical section of a preferred embodiment of the pressure reducing valve;

FIG. 2 is a plan section, taken generally along the line 2—2 in FIG. 1;

FIG. 3 is a section, on a enlarged scale, taken generally along the line 3—3 in FIG. 1;

FIG. 4 is a schematic diagram of the circuit, including the pressure reducing valve, using USASI symbols;

FIG. 5 is a central vertical section of a second embodiment of the pressure reducing valve; and FIG. 6 is a view, similar to FIG. 4, showing a circuit using the pressure reducing valve of FIG. 5.

DESCRIPTION OF THE EMBODIMENTS

While this invention is susceptible of embodiment in many different forms, there is shown in the drawings and will herein be described in detail an embodiment of the invention together with a modification thereof with the understanding that the present disclosure is to be considered as an exemplification of the principles of the invention and is not intended to limit the invention to the embodiments illustrated. The scope of the invention will be pointed out in the appended claims.

The preferred embodiment, shown in FIGS. 1 to 4, has a valve casing 10 with a central bore 11 having a valve member 12 controlling the flow through the valve relative to an inlet passage 13, a controlled pressure outlet passage 14 and a drain passage 15, with the controlled pressure outlet passage being intermediate the inlet passage and the drain passage.

The bore is closed at one end by a threaded cap 16 against which a relatively weak spring 17 has one end abutting, with the other end of the spring being within a recess 18 at an end of the valve member 12 and acting to urge the valve member toward the right as viewed in FIG. 1 to a position in which fluid communication between the inlet passage 13 and the controlled pressure outlet passage 14 is blocked by a land 20 of the valve member.

The valve body 10 has a control section attached to an end thereof, with the control section body 25 bolted to the body 10 by bolts 26. The control section has a bore 27 extending from front to rear thereof and capped by caps 28 and 29 threaded into the opposite ends thereof. A pressure compensating flow control valve member is mounted in the bore, with the valve member being indicated at 30. The pressure compensating flow control valve is the same as that disclosed in Breitsprecher Patent No. 3,146,790 and reference may be made thereto for a detailed description of the operation of such valve. The valve member has an interior passage 31 intersecting radial passages 32 whereby fluid is received from a passage 33 communicating with the radial passages 32 to enter the lengthwise passage 31, with fluid pressure then acting against an end 34 of the valve member 30 and fluid also passing through an orifice 35 to a space in the bore 27 to act against the opposite end of the valve member in conjunction with a spring 36. The chamber 37 containing the spring 36 communicates with an outlet passage 40, with the degree of communication controlled by a land 40a on the valve member 30 whereby a variable orifice is provided by the position of land 40a responsive to the pressure acting on the valve member 30. This results in having a constant rate of flow through the inlet passage 33 and outlet passage 40. The outlet passage 40 in the control section body communicates at its lower end with an intersecting passage 41 which leads to an end 42 of the valve member 12 opposite from the end receiving the spring 17. A simplified version of the pressure reducing valve could rely on an orifice to limit the rate of flow, instead of the pressure compensated flow control valve.

The control section also has a pressure relief valve having a poppet valve member 43 urged into engagement with a valve seat 44 by a spring 45, with the pressure setting of the valve member 43 being controlled by the adjustment of the spring 45 by positioning of a plunger 46 fitted within a chamber 47 in the body. The plunger 46 has an O-ring seal 48. The chamber 47 connects to the drain passage 15 in the valve body 10 by means of a connecting passage 50 formed in bodies 10 and 25 and a passage 51 extending normal thereto leading to the drain passage 15, as shown in FIG. 2 and shown in phantom in FIG. 1. When the relief valve opens, fluid flows from the chamber 47 to drain. The relief valve poppet 43 controls the pressure in passage 41 by the connecting passage 55, as shown in FIG. 1. The relief valve, however, is not responsive to the fluid pressure in passage 41, but is responsive to the outlet pressure from the valve by means of a pilot section 56 of the relief valve which has one end subjected to pressure in passage 41 to balance out the pressure acting directly on the poppet valve member 43.

The control of the relief valve from the controlled outlet pressure which acts on the pilot section 56 of the relief valve is derived from outlet passage 14 in valve body 10 which intersects a passage 60 from which a passage 61 extends which, through a lateral connection, communicates with a passage 62 in the body of the control section 25 and which communicates with a capped chamber 63 opening to the lower end of the pilot section 56 of the relief valve, as shown in FIG. 1.

Fluid at inlet pressure is supplied to the pressure compensating flow control and to passage 33 leading thereto by means of a passage 70 in valve body 10 connecting to passage 33 and through an apertured connecting plug 71 with the entry and of the passage 70 communicating with a passage 72 extending upwardly from the inlet passage 13.

In operation of the valve, the spring 17 normally urges the valve member to the closed position shown in FIG. 1. Upon supply of fluid to the inlet 13, pressure is exerted against the right-hand end of the valve member 12, as shown in FIG. 1, by flow through the pressure compensating flow control and out through passage 41 to engage end 42 of the valve member to urge the valve member against the spring 17 and place inlet passage 13 in communication with controlled pressure outlet passage 14. As shown, controlled outlet pressure is directed to the left-hand end of the valve member through a central passage 80 in the valve member 12 which communicates with the outlet passage 14 through a radial passage 81 whereby the valve member is also subjected to the outlet pressure and maintains a set reduced pressure in the outlet passage 14. Alternatively, inlet pressure could be applied to said left-hand end if it were of a reduced area from that shown to provide a differential area. The maximum pressure at the outlet is controlled by the pilot section 56 of the relief valve so that when the pressure setting obtained by adjustment of spring 45 is exceeded, the poppet valve member 43 opens to bleed pressure from passage 41 acting against face 42 of the valve member, with the result that the valve member 12 moves toward the right in a direction to close communication between the inlet passage 13 and outlet passage 14.

In this valve mechanism, it will be seen that inlet pressure is used to urge the valve member open, so that any tendency for the valve to stick can readily be overcome by inlet pressure, rather than relying on the force of a bias spring, as conventionally known. Also, full system pressure can be used to open the valve member 12, since the pressure relief valve is not responsive to inlet pressure, but solely to pressure existing in the outlet 14. Also, with the spring 17 urging the valve member 12 to closed position, the valve is normally closed so that a high pressure surge in the inlet line cannot get to the outlet line. If it should be desired to have the valve normally open, the spring could be on the opposite end of the valve member from that shown in the drawings.

In the second embodiment, shown in FIGS. 5 and 6, similar parts have been given the same reference numerals as in the preferred embodiment, wth a prime affixed thereto. In this embodiment, the valve member 12' is normally urged to an open position by a spring 100 engaging the right-hand end of the valve member 12' and inlet pressure is applied to the same end of the valve member by flow through a passage 101 which communicates with a chamber 102 in an end cap 103. The chamber 102 communicates with a passage 104 leading to a pressure compensated flow control 30' functioning the same as that in the first embodiment, with the outlet side thereof connecting with a passage 105 communicating with the right-hand end of the valve member. Controlled outlet pressure communicates with the left-hand end of the valve member through passages 80' and 81' formed in the valve member. The maximum pressure acting against the right-hand end of the valve member is controlled by the relief valve having poppet valve member 43' which is in communication with the outlet of the flow control means comprising the pressure compensating flow control through a passage 110 and a connecting passage 111.

If for any reason the valve member should stick, it will be seen that inlet pressure is available to urge the valve member 12' in an opening direction. If desired, the spring 100 could be omitted entirely. In any event, it is desirable to have the spring 100 relatively weak, so that the spring, if it acted alone, would provide a very weak force urging the valve member in an opening direction. The use of inlet pressure to move the valve member in this direction increases the speed of operation of the valve. Another possible variation would be to have the spring 100 at the left-hand end of the valve member 12' to urge the valve member closed and, if this were done, then the relief valve would have to be set for a higher pressure than the controlled outlet pressure, so that sufficient pressure would be available to control the valve member 12', including acting against the force of the spring 100.

We claim:

1. A pressure reducing valve comprising a casing having an inlet connectable to a source of fluid and an outlet for fluid having a controlled pressure, a valve member in said casing for controlling the flow of fluid between the inlet and outlet, means for applying fluid pressure against the ends of said valve member including passage means for applying inlet fluid pressure effectively against one end of said member to urge the valve member in a direction to open the valve and whereby the valve member throttles the flow through the valve, flow control means for controlling the rate of fluid flow from the inlet through said passage means, and means for setting the valve for a maximum value of controlled pressure including a relief valve with a pilot section, said relief valve having its outlet in circuit with the flow control means and downstream thereof to limit the flow out of said relief valve when open, and means connecting the pilot section of the relief valve in fluid communication with said outlet to have the relief valve respond only to said controlled pressure whereby full system pressure at the inlet can be utilized to open the valve.

2. A pressure reducing valve as defined in claim 1 including spring means engaging said valve member and urging the valve member to closed position whereby a high pressure surge at the inlet cannot reach the valve outlet.

3. A pressure reducing valve as defined in claim 1 including a drain passage at the side of the outlet opposite the inlet whereby excessive outlet pressure will shift the valve member to open the outlet to said drain passage.

4. A pressure reducing valve having a body with a bore and a valve member movable therein, passages communicating with the bore including a fluid inlet, a drain outlet and an intermediate controlled pressure outlet, means for applying fluid pressure against both ends of the valve member including passage means connecting said fluid inlet to the bore at a location to act on said valve member and urge the valve member in a direction to open the valve and place the fluid inlet and controlled pressure outlet in fluid communication, control means interposed in said passage means to limit the maximum flow therethrough, and a pressure relief valve connected in communication with said passage means and having an outlet communicating with said passage means and a pilot section responsive only to the controlled pressure whereby full system pressure can be used to open the pressure reducing valve without opening of the relief valve.

5. A pressure reducing valve as defined in claim 4 including resilient means urging said valve member toward closed position.

References Cited

UNITED STATES PATENTS 3,246,669  4/1966  Adams _____ 137—489 XR

FOREIGN PATENTS 949,607  2/1964  Great Britain.

WILLIAM F. O'DEA, Primary Examiner

H. M. COHN, Assistant Examiner

U.S. Cl. X.R.

137—489